(12) United States Patent
Chen et al.

(10) Patent No.: US 12,647,403 B2
(45) Date of Patent: Jun. 2, 2026

(54) MULTIPLEXING ENCRYPTED TUNNELS

(71) Applicant: Palo Alto Networks, Inc., Santa Clara, CA (US)

(72) Inventors: Min Hao Chen, Milpitas, CA (US); Yash Amin, Milpitas, CA (US); Pradeep K. Aragonda, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 37 days.

(21) Appl. No.: 18/751,956

(22) Filed: Jun. 24, 2024

(65) Prior Publication Data

US 2025/0392578 A1     Dec. 25, 2025

(51) Int. Cl.
*H04L 9/40* (2022.01)

(52) U.S. Cl.
CPC ........ *H04L 63/0485* (2013.01); *H04L 63/029* (2013.01)

(58) Field of Classification Search
CPC ........................... H04L 63/0485; H04L 63/029

USPC ....................................................... 713/160
See application file for complete search history.

(56) References Cited

U.S. PATENT DOCUMENTS

| | | | |
|---|---|---|---|
| 9,331,920 B2 * | 5/2016 | Nedeltchev | ............. H04L 43/18 |
| 2006/0262783 A1 * | 11/2006 | Nedeltchev | ........... H04L 63/164 |
| | | | 370/389 |
| 2019/0020684 A1 * | 1/2019 | Qian | ...................... H04L 63/205 |
| 2019/0104438 A1 * | 4/2019 | Mittal | ................... H04W 99/00 |
| 2021/0037057 A1 * | 2/2021 | Suleman | ............. H04L 63/0272 |
| 2021/0400029 A1 * | 12/2021 | Wang | ................... H04L 63/0485 |

* cited by examiner

*Primary Examiner* — Michael S McNally

(74) *Attorney, Agent, or Firm* — Gilliam IP PLLC

(57) ABSTRACT

Multiplexing of encrypted tunnels is facilitated by the use of a custom header. Upon receiving a packet, information about the packet is collected stored, such as a port number, destination instance identifier, and a hash key. A custom packet is generated that includes the encrypted packet and a custom header including some or all of the collected information. Middleware may retrieve information from the custom header to perform load balancing, routing, or other function. The destination instance may use information from the custom header to obtain the port number, which may be changed in the custom packet to accommodate limitations of the middleware.

10 Claims, 5 Drawing Sheets

MULTIPLEXING ENCRYPTED TUNNELS

FIELD OF THE INVENTION

The present invention relates generally to systems and methods for multiplexing encrypted tunnels.

BACKGROUND OF THE INVENTION

Encrypted tunnels are implementing by encrypting packets and encapsulating the packets into other packets that are sent over the encrypted tunnel. Encrypted tunnels are very helpful to protect privacy and maintain security.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
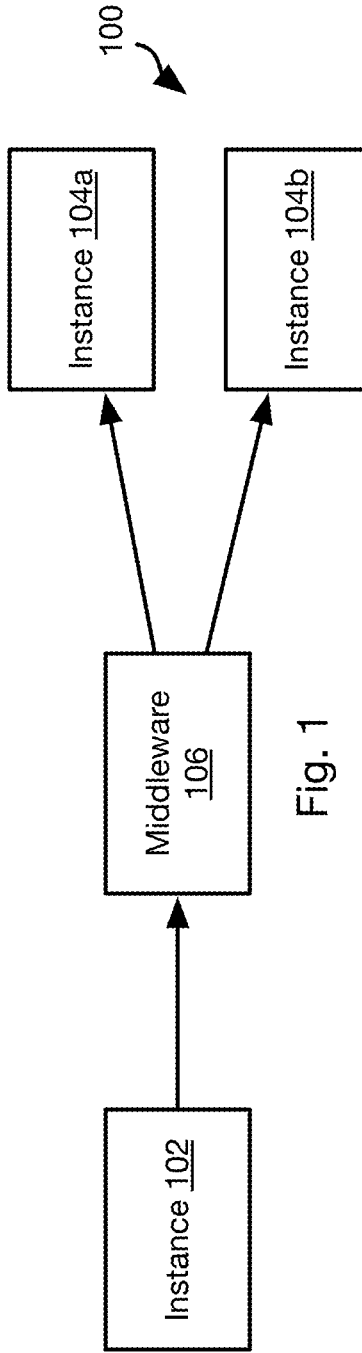
FIG. 1 is a schematic block diagram illustrating a scenario in which the use of a customer header may be helpful in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a network environment 100 may include an instance 102 that exchanges packets with two or more instances 104a, 104b. The instance 102 communicates with the two or more instances 104a, 104b by way of middleware 106.

Each instance 102, 104a, 104b may be a user device (mobile phone, tablet computer, laptop computer, desktop computer, etc.). Each instance 102, 104a, 104b may also be an executable instance executing on a server, a cloud computing platform, or other computer system. The cloud computing platform may be AMAZON WEB SERVICES (AWS), MICROSOFT AZURE, GOOGLE CLOUD PLATFORM (GCP), ORACLE CLOUD INFRASTURCTURE, or the like. Some or all of the instances 102, 104a, 104b may alternatively execute in a computing device of a data center.

The middleware 106 may be security device (e.g., firewall), load balancer, router, switch, or other network device. The middleware 106 may execute on a server or in the same cloud computing platform or a different cloud computing platform.

The instance 102 may establish an encrypted tunnel with respect to each instance 104a, 104b. Accordingly, the middleware 106 is unable to inspect the contents of packets transmitted over the encrypted tunnels.

Encrypted tunnels, such as WIREGUARD, typically encrypt an original packet at an L3 or higher networking protocol. Encryption is necessary from the security and privacy standpoint, but the lack of visibility into inner headers presents multiple problems. The approach described herein enables the multiplexing of multiple encrypted tunnels, while working within the constraints of existing middleware, such as middleware executing in a cloud computing platform. For example, using the approach described herein, instance 102 may implement multiple encrypted tunnels to one or more instances 104a, 104b while still enabling the middleware 106 to function properly.

In an encrypted tunnel, an original packet is encrypted and encapsulated in another L3/L4 header. The outer encapsulation is typically user datagram protocol (UDP) based. UDP encapsulation is chosen due to the small UDP header size (8 bytes) and also due to known transport control protocol (TCP) encapsulation issues like TCP Meltdown.

The approach described herein addresses operational difficulties involving encrypting and encapsulating multiple tunnels between two endpoints, particularly in a cloud native environment.

A UDP-based tunnel typically contains four pieces of information that the middleware 106 can use to identify the tunnel: source internet protocol (IP) address, source port, destination IP address, and destination port. The source and destination IP addresses are typically fixed because they are determined by the source's NAT IP address and the destination external IP address exposed by a load balancer. The destination port is also fixed, determined by the service definition. This leaves the source port, which is typically unreliable. In a cloud environment, the source NAT may perform network address port translation (NAPT) depending on the NAT implementation. This means that the source port could be subject to change, unbeknownst to the destination.

The encapsulation and encryption together presents the following problems. First of all, using an encapsulation header makes it difficult to create multiple tunnels between endpoints using a single destination port. Having a single port is usually an operational constraint; opening additional ports may involve multiple teams in an enterprise environment. Ideally, software should dynamically detect the need to create additional tunnels. For example, middleware 106 implemented as a security device may open a required ingress port for instance 102 and no more. If instance 102 attempts a second tunnel on a second port, the security device will block the traffic until a human operator opens up the second port.

A second problem of encrypting the original packet through a tunnel is that the information required to multiplex a session is hidden from the middleware 106. For example, middleware 106 may implement a network load balancer that needs to multiplex multiple tunnels. In the scenario of FIG. 1, there are two instances 104a, 104b and the need to multiplex two tunnels to instance 102. However, because inner headers are encrypted, the information required to multiplex the tunnels is not visible to the middleware 106. In this case, the middleware 106 can only multiplex based on the same 4-tuple information, and therefore may be able to form a tunnel to instance 104a but not instance 104b.

The third problem concerns information exchange between the source and destination. In order to dynamically adjust tunnel creation, one must exchange information between the source and destination sites, e.g. instance 102 and the instances 104a, 104b. One way to do it is to have an out-of-band communication channel. However, out-of-band communication is subject to timing issues which can be error prone, especially when latency is high between the instances 102, 104a, 104b. One possible reason for this information exchange is to maintain a one-to-one instance count between instance 102 and an instance 104a, 104b.

For example, suppose instance 102 and instance 104a need to form a tunnel at time t1, which requires exchanging meta information to be exchanged between them at time t0 before the middleware 106 knows how to forward traffic at time t2. The instance 102 can try to initiate metadata transfer before forming the tunnel, i.e. making sure t0<t1. However, there is no guarantee that this metadata arrives at the instance 104a in the same order, i.e., t0 and t1 is not deterministic. For this reason, the timing is error prone, which calls for an in-band communication mechanism.

FIGS. 2 to 5 illustrate an approach for multiplexing encrypted tunnels. The approach described below may implement some or all of the following:

A custom header between an outer UDP header and an encryption header.

An encapsulation/decapsulation module after a networking stack in an egress interface and before the networking stack in an ingress interface.

An information collector module for facilitating generation of the custom header.

The inclusion of metainformation in the custom tunnel header.

An additional packet manipulation module that modifies/restores UDP port and multiplexes traffic based on meta-information in the custom header.

Figures 2, 3:
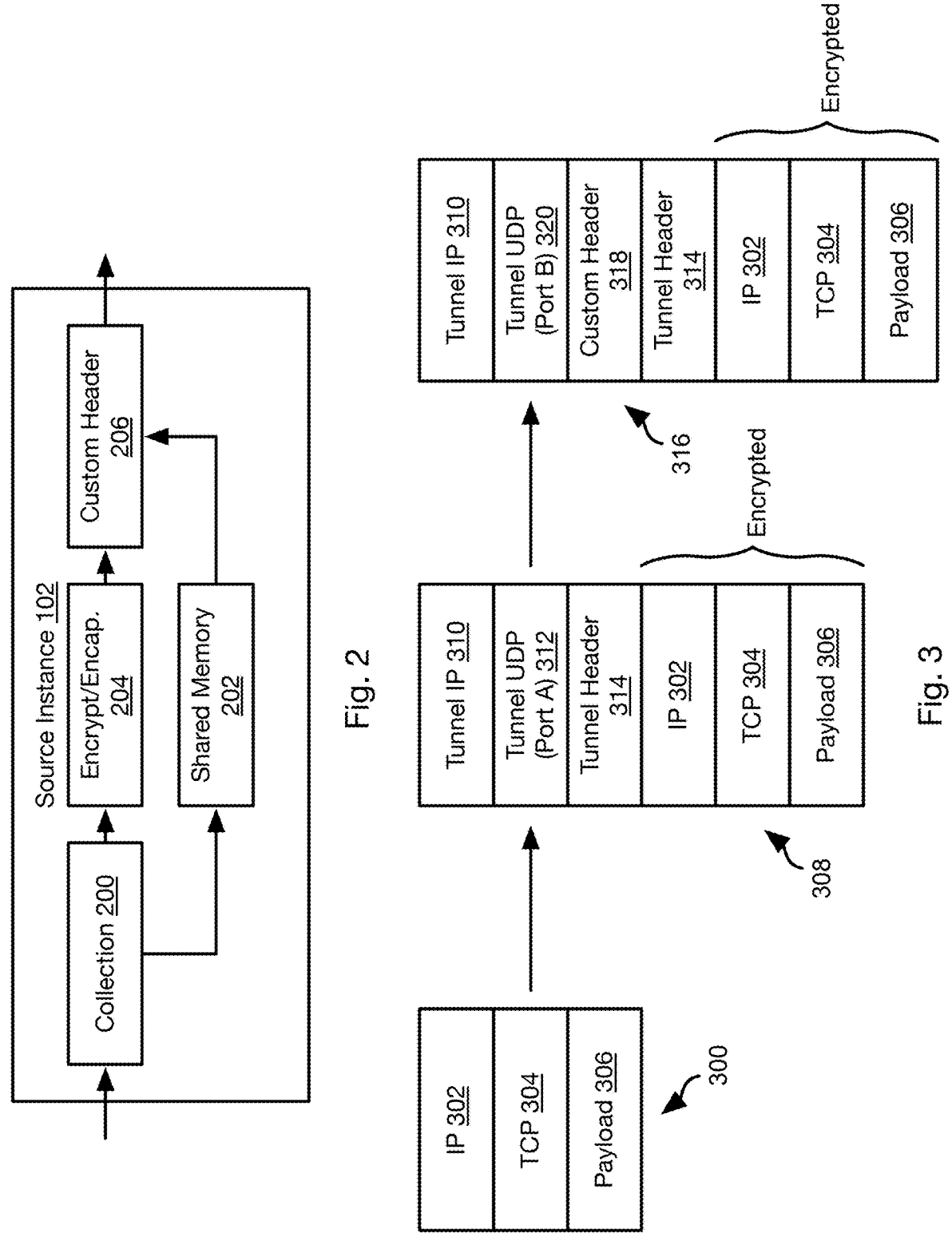
FIG. 2 is a schematic block diagram showing the implementation of a customer header by a source instance in accordance with an embodiment of the present invention.
FIG. 3 illustrates the process of building an encrypted packet including a custom header in accordance with an embodiment of the present invention.

Referring specifically to FIG. 2, a source instance 102 may execute a collection module 200 that collects information for an encrypted connection. The encrypted connection may be initiated by software executing on a host executing the source instance 102, software executing in the same cloud computing platform as the source instance 102, or the source instance 102 itself.

The information collected for the encrypted connection may include information that may be used to facilitate multiplexing the encrypted connection with one or more other encrypted connections. For example, the collection module may collect some or all of the following information:

> Base port number and offset: the base port is the only open port on the middleware 106, while the offset is used to recompute the port of the encrypted connection after the tunnel has reached behind the middleware 106, but before it is received from the instance 104a, 104b where the encrypted connection terminates.

> Instance identifier (ID): The instance ID may be a single-byte value that indicates to a receiver (middleware 106 or instance 104a, 104b) which instance 102 is initiating the encrypted connection.

> Hash key. The hash key is used to multiplex packets within the encrypted connection, such as before decryption happens.

In operation, the collection module 200 evaluates an encrypted connection in its original form, e.g., prior to encryption and encapsulation in a UDP header. Accordingly, the original IP address and TCP header are in plain text. The hash key may be generated for each packet based on payload of each packet, which may include headers from one or more higher-level protocols, such as L3 and/or L4 headers.

Each packet of the encrypted connection may be processed by an encryption and encapsulation module 204 to obtain an encrypted packet that includes an encrypted version of the packet as well as a tunnel header. Processing of the packet may be performed after processing according to the network stack of the instance 102. For example, referring to FIG. 3, prior to processing by the collection module 200, the packet 300 may include an IP address 302, a TCP header 304, and payload data 306. Note that the TCP header 304 is exemplary only and a header according to any other networking protocol may be used in a like manner, such as a UDP or internet control message protocol (ICMP) header.

The encrypted packet 308 may include the original packet 300 in encrypted form, including encrypted versions of the IP address 302, TCP header 304, and payload data 306, such as the IP address 302, TCP header 304, and payload data 306 encrypted into a single block of encrypted data. The encrypted packet 308 may include a tunnel IP address (which will typically be different from the IP address 302), a tunnel UDP header 312, and a tunnel header 314. The tunnel UDP header 312 may include a port number ("port A").

The encrypted packet 308 may be passed to a custom header module 206 that adds a custom header to the encrypted packet 308 to generate a custom packet. For example, as shown in FIG. 3, the custom packet 316 may include the encrypted versions of the IP address 302, TCP header 304, and payload data 306, the tunnel IP address 310, tunnel header 314, and a customer header 318 generated by the custom header module 206. The custom packet 308 may further include a tunnel UDP header 320 that may be obtained by performing one or more transformations of the tunnel UDP header 312. For example, the port number may be changed (e.g., from port A to port B).

The custom header module 206 may generate the custom header 318 and possibly modify the tunnel UDP header 312 to obtain the tunnel UDP header 320 using information from the shared memory 202. The custom header 320 may record the base port number of the tunnel UDP header 312 that has been changed to the port number of the tunnel UDP header 320 (e.g., include the base port number or an offset that may be used to obtain the base port number). The customer header 318 may further include other information, such as one or both of the instance ID and hash key. The instance ID and hash key may be generated by the custom header module 206 to facilitate multiplexing, e.g., for each encrypted connection terminated by instance 102 that is transmitted through the middleware 106. The instance ID and hash key for each encrypted connection may be unique relative to other encrypted connections that are multiplexed at the same time.

As shown in FIG. 3, the custom header 318 may be inserted after the UDP header 320, e.g., between the tunnel UDP header 320 and the tunnel header 314. Placement after the tunnel UDP header 320 may enable the custom packet 316 to be transmitted as a normal UDP packet over the port referenced in the tunnel UDP header 320 (e.g., port B). Accordingly, port B is the only port that needs to be opened on instance 102 and middleware 106 in a security rule.

Figures 4, 5:
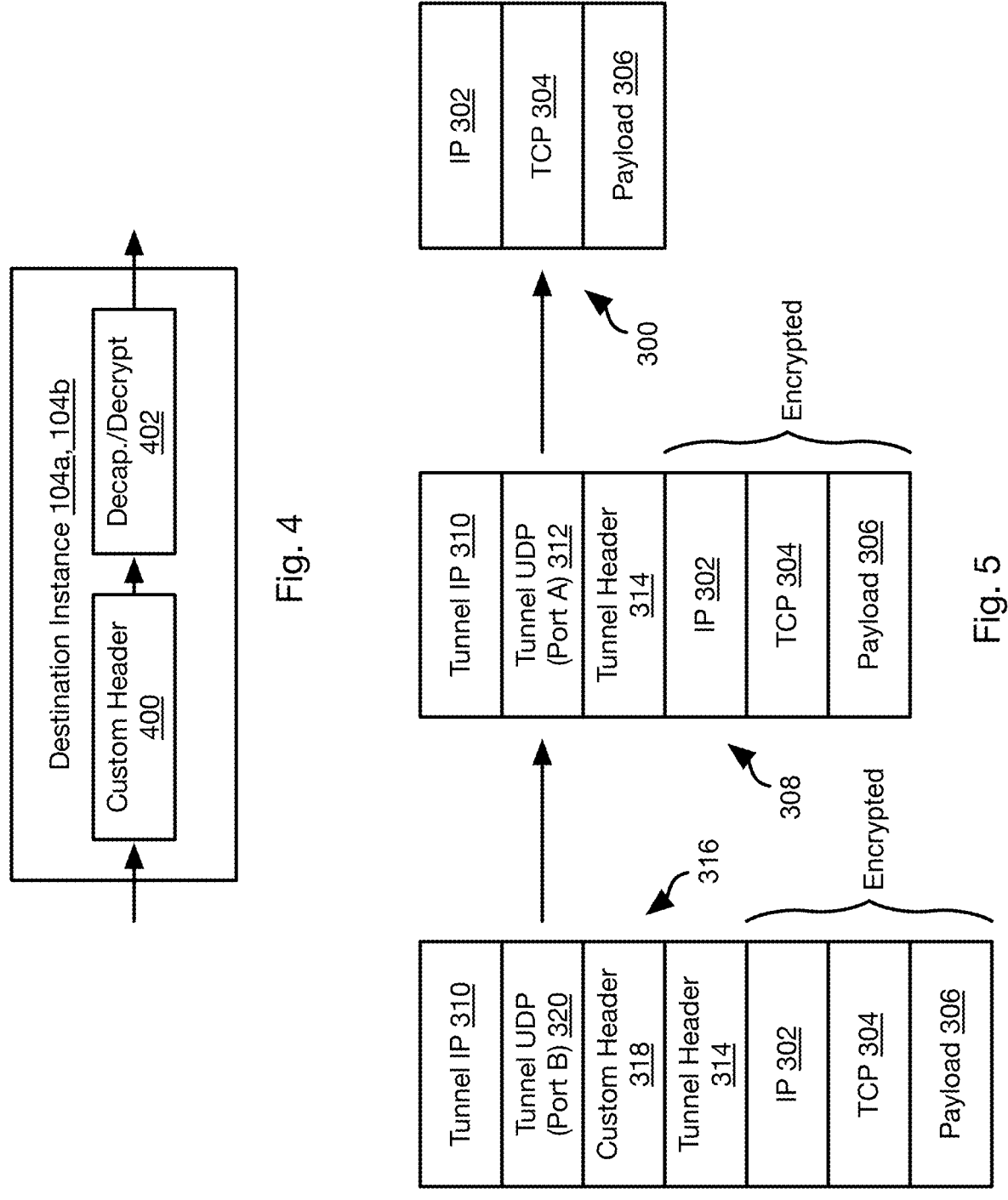
FIG. 4 is a schematic block diagram showing the use of a customer header by a destination instance in accordance with an embodiment of the present invention.
FIG. 5 illustrates the process of decapsulating an encrypted packet including a custom header in accordance with an embodiment of the present invention.

FIGS. 4 and 5 illustrate the processing of the custom packet 316 at the destination instance 104a, 104b. For example, a custom header module 400 of the destination instance 104a, 104b may receive the custom packet 316 and evaluate the custom header 318. In particular, the custom header module 400 may retrieve the port offset and add the port offset to the port in the tunnel UDP header 320 to obtain an original port number (port B). The custom header module 400 may further remove the custom header 318 and modify the tunnel UDP header 320 to include the original port number (Port A) and thereby recreate the original tunnel UDP header 312 and the original encrypted packet 308.

The customer header module 400 may pass the encrypted packet 308 to a decapsulation and decryption module 402. The decapsulation and decryption module 402 terminates the encrypted connection and removes the tunnel IP address 310, tunnel UDP header 312, and tunnel header 314. The decapsulation and decryption module 402 further decrypts the IP address 302, TCP header 304, and payload data 306 to obtain the original packet 300. The original packet 300 may then be passed to the network stack of the destination instance 104a, 104b.

Note that the decapsulation and decryption module 402 need not have any awareness of the change in port number of the UDP header 320 since this change is reversed prior to passing the encrypted packet 308 to the decapsulation and decryption module 402. Likewise, the generation and use of the hash key is independent of the operation of the decapsulation and decryption module 402.

Accordingly, at least the following functionalities are enabled using custom headers 318 as defined above:

> The source of the original packet or the custom header modules 206, 400 may open connections between any arbitrary ports without requiring modification of the middleware 106 thereby enabling multiplexing of multiple connections through the middleware 106.

> The middleware 106 has access to the custom header 318, which is unencrypted and may use the port number and hash key to perform load balancing, routing of packets to different destination instances 104a, 104b, or other purposes. For example, the middleware may use the hash key to deterministically and repeatably select which of the destination instances 104a, 104b will receive a custom packet 316.

Figure 6:
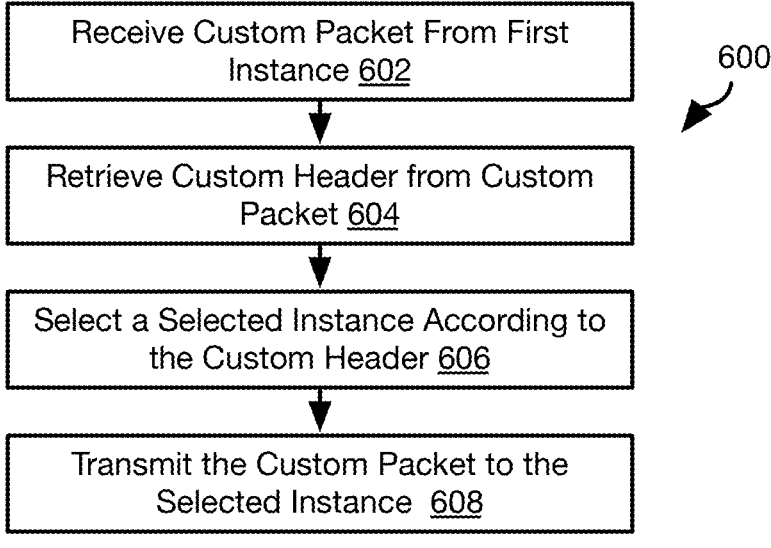
FIG. 6 is a process flow diagram of a method for processing a custom packet using middleware in accordance with an embodiment of the present invention.

FIG. 6 illustrates a method 600 that may be performed by the middleware 106. The method 600 includes receiving 602 a custom packet 316 from a first instance 102. The middleware 106 then retrieves 604 the custom header 318 from the custom packet 316. The middleware 106 selects 606 a selected second instance 104a, 104b from among a plurality of second instances 104a, 104b according to the custom header. The middleware 106 then transmits 608 the custom packet 316 to the selected second instance 104*a*, 104*b*.

Step 606 may include selecting the selected second instance 104*a*, 104*b* according to a load balancing algorithm. For example, the second instance 104*a*, 104*b* may be selected as a function of the hash key included in the custom header 318 as part of the load balancing algorithm. Selecting 606 the second instance may include selecting the selected second instance 104*a*, 104*b* according to a routing algorithm. For example, the instance identifier represented in the hash key (or the instance identifier included in the custom header 318) may be used to identify the second instance 104*a*, 104*b* corresponding to the instance identifier and the custom packet 316 may be transmitted to that second instance 104*a*, 104*b*.

Figure 7:
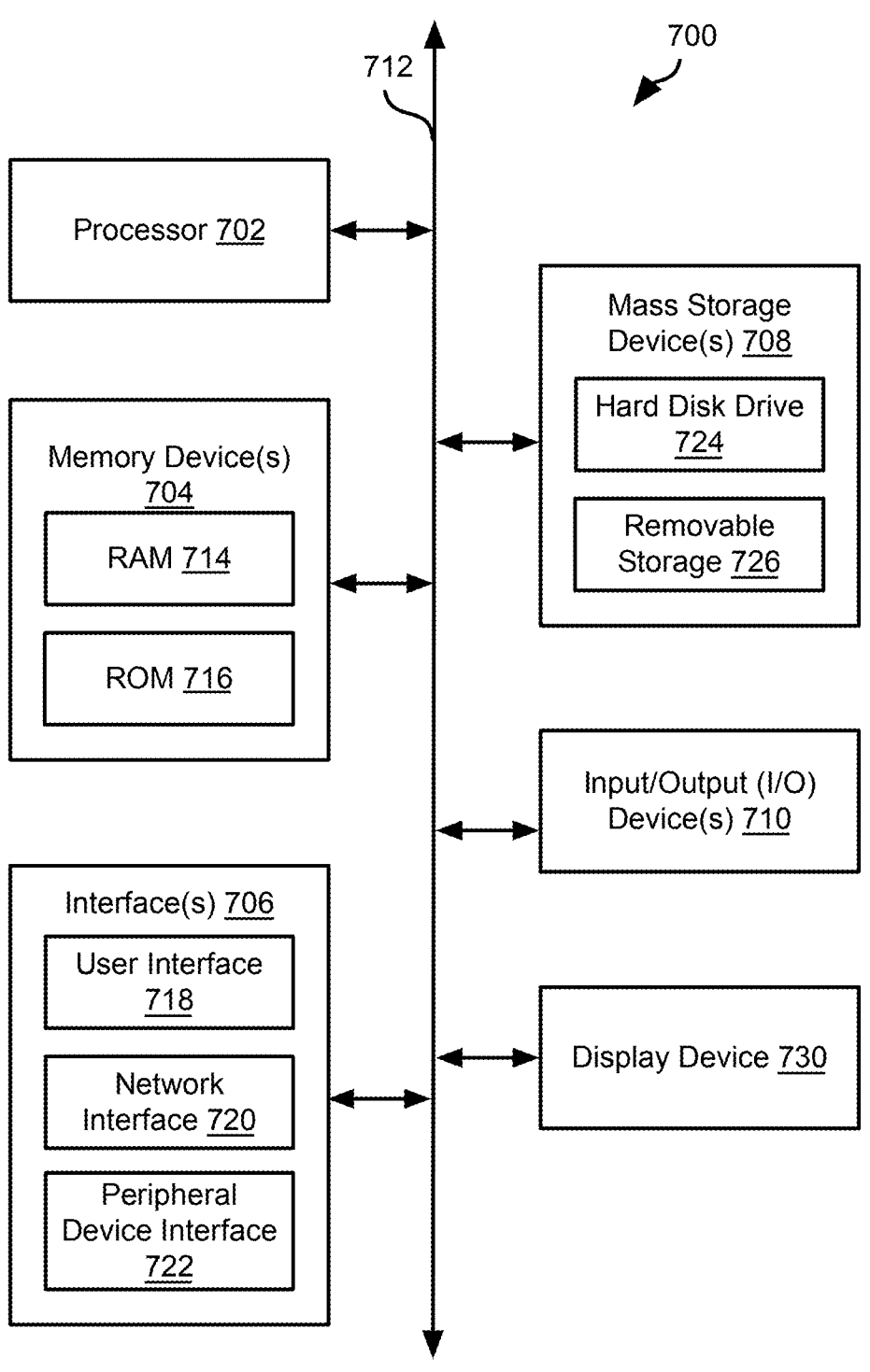
FIG. 7 illustrates an example computing device.

FIG. 7 illustrates an example computing device 700 that may be used to implement the instances 102, 104*a*, 104*b*, middleware 106, a cloud computing platform or any other computing devices described above. In particular, components described above as being a computer or a computing device may have some or all of the attributes of the computing device 700 of FIG. 7.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s)

706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
encrypting an original packet and encapsulating the encrypted packet for tunneling;
modifying the tunneling encapsulated encrypted packet, wherein the modifying comprises adding a custom header to the tunneling encapsulated encrypted packet, changing a first port number in a tunnel user datagram protocol (UDP) header to a second port number, and recording the first port number or an offset between the first and second port numbers into the custom header; and
transmitting the modified packet to a destination.

2. The method of claim 1 further comprising determining a source identifier and a hash key derived from a L3 or L4 header of the original packet.

3. The method of claim 2 further comprising storing the source identifier and the hash key from the original packet prior to encrypting the original packet.

4. The method of claim 3 further comprising:
storing the source identifier and a second hash key derived from a second original packet;
encrypting the second original packet and encapsulating the encrypted second original packet for tunneling;
modifying the tunneling encapsulated, encrypted second original packet, wherein the modifying comprises adding a second custom header to the tunneling encapsulated encrypted second original packet, changing a third port number in a tunnel user datagram protocol (UDP) header to a fourth port number, and recording the third port number or an offset between the third and fourth port numbers into the custom header to obtain a second modified packet; and
transmitting the second modified packet to a second destination.

5. The method of claim 1, further comprising passing the original packet to a networking stack for the encrypting and encapsulating, wherein the modifying is after the networking stack encrypts and encapsulates the original packet for tunneling.

6. The method of claim 1, wherein the first port number is an open port of a firewall between a source of the original packet and the destination.

7. A method comprising:

retrieving a base port number or port offset from a custom header of a tunneling encapsulated packet that comprises an encrypted packet, the custom header, a tunnel header, a tunnel user datagram protocol (UDP) header that indicates a first port number, and a tunnel Internet Protocol (IP) header;

modifying, the tunneling encapsulated packet to change the first port number in the tunnel UDP header to a second port number that is the base port number or based on applying the port offset to the first port number and removing the custom header; and passing the modified, tunneling encapsulated packet to a networking stack for tunnel decapsulation and decrypting.

8. A method comprising:

retrieving a custom header from a tunneling encapsulated packet which comprises an encrypted packet, the custom header, a tunnel header, a tunnel user datagram protocol (UDP) header, and a tunnel Internet Protocol (IP) header;

determining an identifier of a source of the encrypted packet from the customer header;

selecting a destination from a plurality of destinations based, at least in part, on the source identifier determined from the custom header; and transmitting the tunneling encapsulated packet to the selected destination.

9. The method of claim 8, further comprising determining, from the custom header, a hash key derived from a L3 or L4 header of the encrypted packet, wherein selecting the destination is also based on the hash key.

10. The method of claim 9, wherein selecting the destination based on the source identifier and the hash key comprises load balancing based on the hash key.

* * * * *